(12) United States Patent
Lee

(10) Patent No.: US 8,651,226 B2
(45) Date of Patent: Feb. 18, 2014

(54) RACK-DRIVEN POWER STEERING APPARATUS

(71) Applicant: Mando Corporation, Pyeongtaek-Si (KR)

(72) Inventor: Jong Min Lee, Gyeonggi-do (KR)

(73) Assignee: Mando Corporation, Pyeongtaek-Si (KR)

(*) Notice: Subject to any disclaimer, the term of this patent is extended or adjusted under 35 U.S.C. 154(b) by 0 days.

(21) Appl. No.: 13/776,162

(22) Filed: Feb. 25, 2013

(65) Prior Publication Data

US 2013/0220728 A1    Aug. 29, 2013

(30) Foreign Application Priority Data

Feb. 24, 2012    (KR) .................. 10-2012-0018799

(51) Int. Cl.
*B62D 5/04*    (2006.01)
*B62D 3/12*    (2006.01)

(52) U.S. Cl.
USPC .................. 180/444; 180/443; 180/446

(58) Field of Classification Search
USPC ........................ 180/443, 444, 446
See application file for complete search history.

(56) References Cited

U.S. PATENT DOCUMENTS

2005/0183902 A1*  8/2005  Segawa et al. ............... 180/444
2008/0129133 A1*  6/2008  Taube et al. .................... 310/80

* cited by examiner

*Primary Examiner* — Tony Winner
*Assistant Examiner* — Jacob Knutson
(74) *Attorney, Agent, or Firm* — McDermott Will & Emery LLP

(57) ABSTRACT

A rack-driven power steering apparatus mitigates frictional force and noise produced due to iron powder generated by continuous frictions while balls are circulating in inner peripheral screw grooves and outer peripheral screw groove defined by a rack bar and a ball nut. The rack-driven power steering apparatus collects iron powder scattered between the rack bar and the ball nut in one place so that the iron powder can be easily removed. Therefore, the rack-driven power steering apparatus protects components, increases durability, and improves maintenance efficiency.

10 Claims, 7 Drawing Sheets

RACK-DRIVEN POWER STEERING APPARATUS

CROSS-REFERENCE TO RELATED APPLICATION

This application claims priority from and the benefit under 35 U.S.C. §119(a) of Korean Patent Application No. 10-2012-0018799, filed on Feb. 24, 2012, which is hereby incorporated by reference for all purposes as if fully set forth herein.

BACKGROUND OF THE INVENTION

1. Field of the Invention

The present invention relates to a rack-driven power steering apparatus, and more particularly to a rack-driven power steering apparatus which mitigates frictional force and noise produced due to iron powder generated by continuous frictions while balls are circulating in inner peripheral screw grooves and outer peripheral screw groove defined by a rack bar and a ball nut, and collects iron powder scattered between the rack bar and the ball nut in one place so that the iron powder can be easily removed. Therefore, the rack-driven power steering apparatus can protect components, increase durability, and improve maintenance efficiency.

2. Description of the Prior Art

A general rack-driven power steering apparatus includes a steering system extending from a steering wheel to the two wheels, and an auxiliary power mechanism for supplying the steering system with auxiliary steering power.

FIG. 1 is a partially sectional view schematically illustrating a general rack-driven power steering apparatus. FIG. 2 is a sectional view schematically illustrating a belt type transmission unit of the general rack-driven power steering apparatus.

A general rack-driven power steering apparatus includes a steering system 100 extending from a steering wheel 105 to the two wheels 150, and an auxiliary power mechanism 160 for supplying the steering system with auxiliary steering power.

In the steering system 100, an upper end of a steering shaft 110 is connected to the steering wheel 105 to be rotated together with the steering wheel 105, and a lower end thereof is connected to a pinion shaft 120 by means of a pair of universal joints 115. The pinion shaft 120 is connected to the rack bar 155 through the rack-pinion mechanism 135, and opposite ends of the rack bar 155 are connected to the wheels 150 of the vehicle through a tie rod 140 and a knuckle arm 145.

The rack-pinion mechanism 135 is formed by engaging a pinion gear 125 formed at a lower end of the pinion shaft 120 with a rack gear 130 formed at one side of an outer peripheral surface of the rack bar 155.

The auxiliary power mechanism 160 includes a torque sensor 117 for detecting a steering torque applied to the steering wheel 105 by the driver and outputting an electrical signal proportional to the detected steering torque, an electronic control unit (ECU) for generating a control signal based on the electrical signal transmitted from the torque sensor 117, a motor 165 for generating an auxiliary steering power based on the control signal transmitted from the electronic control unit, and a belt type transmission unit 170 for transferring the auxiliary power generated by the motor 165 to the rack bar 155 by means of a belt 210.

The belt type transmission unit 170 includes a motor 165 controlled by the electronic control unit (ECU), a motor pulley 205a fixed to a shaft 165a of the motor 165, a belt 210 wound on the motor pulley 205a, a ball nut 220 installed within a rack housing 200 surrounding the rack bar 155 to support the rack bar 155, and a nut pulley 205b coupled to an outer peripheral surface of the ball nut 220.

The ball nut 220 is coupled to the rack bar 155 by means of balls to slide the rack bar 155 within the housing 200 while being rotated, and a bearing 240 for supporting rotation of the ball nut 220 is mounted to an outer peripheral surface of the ball nut 220.

However, according to the related art, iron powder is generated by continuous friction while the balls are circulating in an inner peripheral screw groove and an outer peripheral screw groove of the rack bar and the ball nut which increases frictional force and generates noise.

Further, the iron powder scattered between the rack bar and the ball nut lowers power transmission efficiency and disturbs accurate transmission of auxiliary power.

In addition, due to this, when an error or damage is severe in the ball nut, the nut pulley, the motor or the electronic control unit, steering may be disabled during high speed travel of the vehicle and thus a safety accident may be caused.

SUMMARY OF THE INVENTION

Accordingly, the present invention has been made to solve the above-mentioned problems occurring in the prior art, and an object of the present invention is to provide a rack-driven power steering apparatus which mitigates frictional force and noise produced due to iron powder generated by continuous frictions while balls are circulating in inner peripheral screw grooves and outer peripheral screw groove defined by a rack bar and a ball nut.

Another object of the present invention is to provide a rack-driven power steering apparatus, which collects iron powder scattered between the rack bar and the ball nut in one place so that the iron powder can be easily removed, protects components, increases durability, and improves maintenance efficiency.

In order to accomplish this object, there is provided a rack-driven power steering apparatus including: a rack bar having an outer peripheral screw groove spirally formed on an outer peripheral surface thereof; a ball nut having an inner peripheral screw groove corresponding to the outer peripheral screw groove on an inner peripheral surface thereof and having a ball circulation passage axially extending between the inner peripheral surface and an outer peripheral surface thereof; and a plurality of balls inserted into the outer peripheral screw groove and the inner peripheral screw groove to slide the rack bar while rolling, wherein at least one magnetic ball having a magnetic force is disposed between the balls.

According to the present invention, a rack-driven power steering apparatus mitigates frictional force and noise produced due to iron powder generated by continuous frictions while balls are circulating in inner peripheral screw grooves and outer peripheral screw groove defined by a rack bar and a ball nut.

Further, the rack-driven power steering apparatus collects iron powder scattered between the rack bar and the ball nut in one place so that the iron powder can be easily removed, protects components, increases durability, and improves maintenance efficiency.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
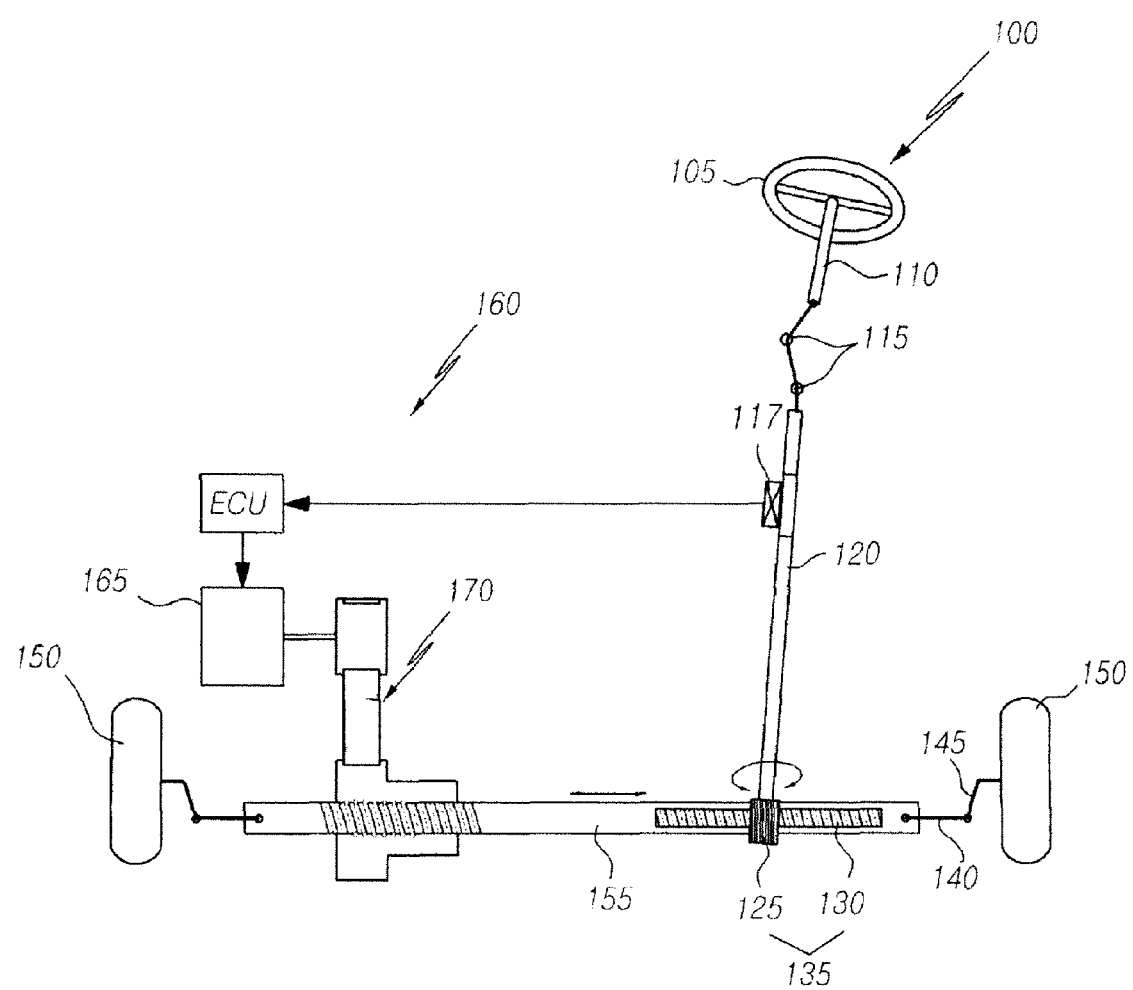
FIG. 1 is a partially sectional view schematically illustrating a general rack-driven power steering apparatus.

Hereinafter, exemplary embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected", "coupled" or "joined" to another component, a third component may be "connected", "coupled", and "joined" between the first and second components, although the first component may be directly connected, coupled or joined to the second component.

Figure 3:
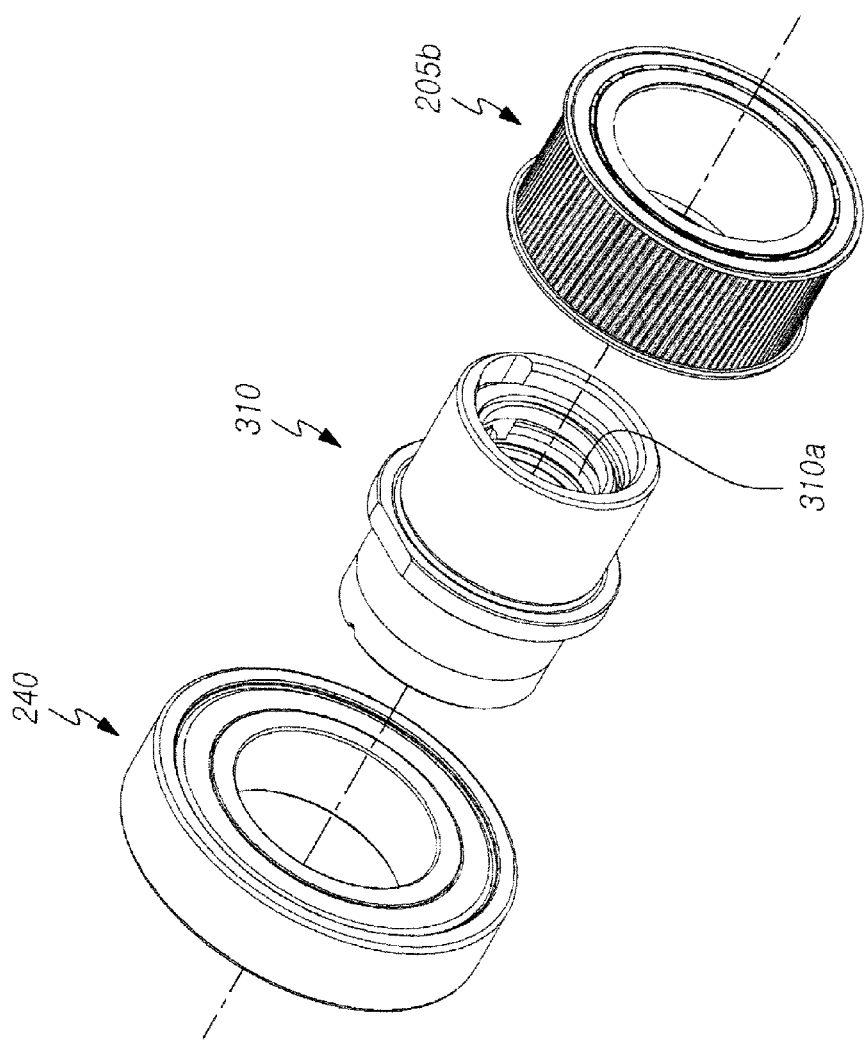
FIG. 3 is an exploded perspective view illustrating a portion of a rack-driven power steering apparatus according to the present invention.
Figure 4:
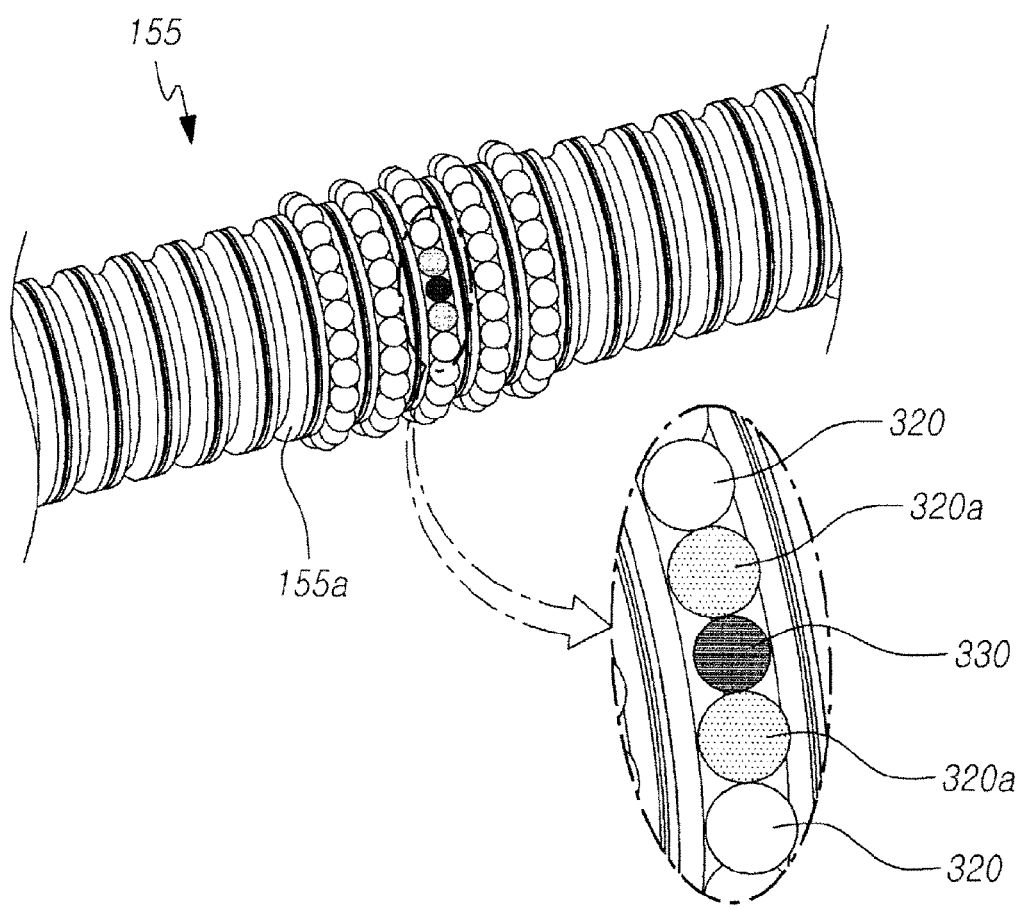
FIG. 4 is a perspective view illustrating a portion of the rack-driven power steering apparatus according to the present invention.
Figure 5:
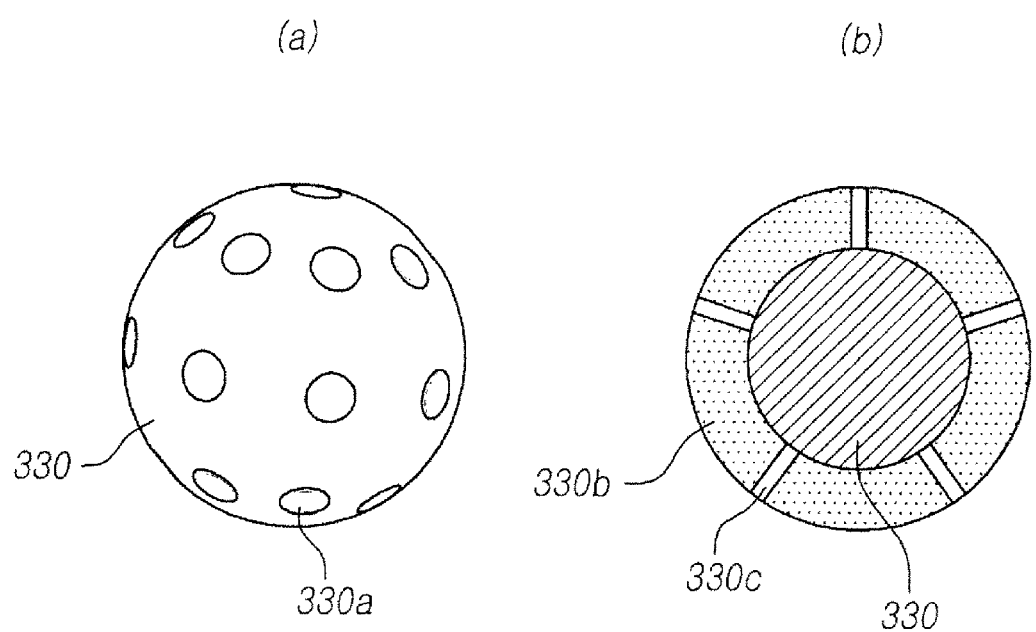
FIG. 5 is a view illustrating a magnetic ball of the rack-driven power steering apparatus according to the present invention.
Figure 6:
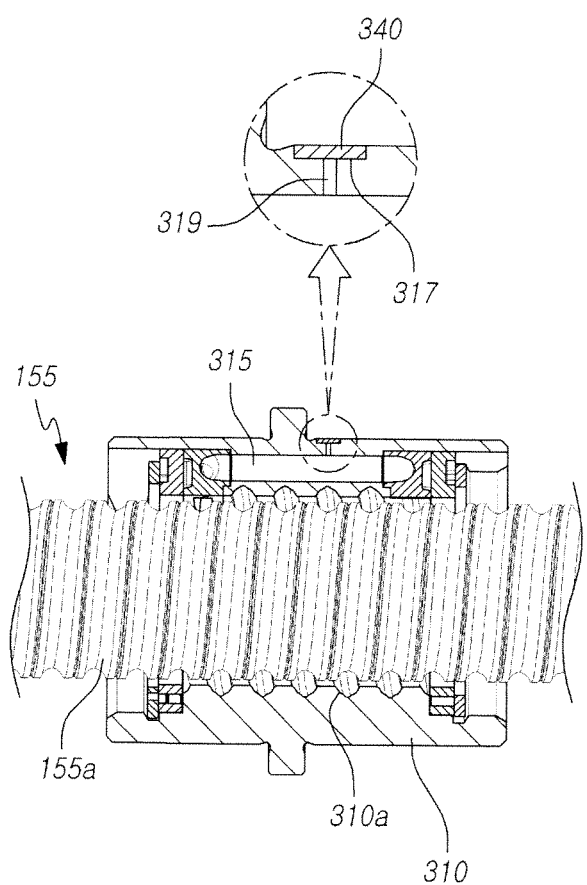
FIGS. 6 and 7 are sectional views illustrating a portion of the rack-driven power steering apparatus according to the present invention.
Figure 7:
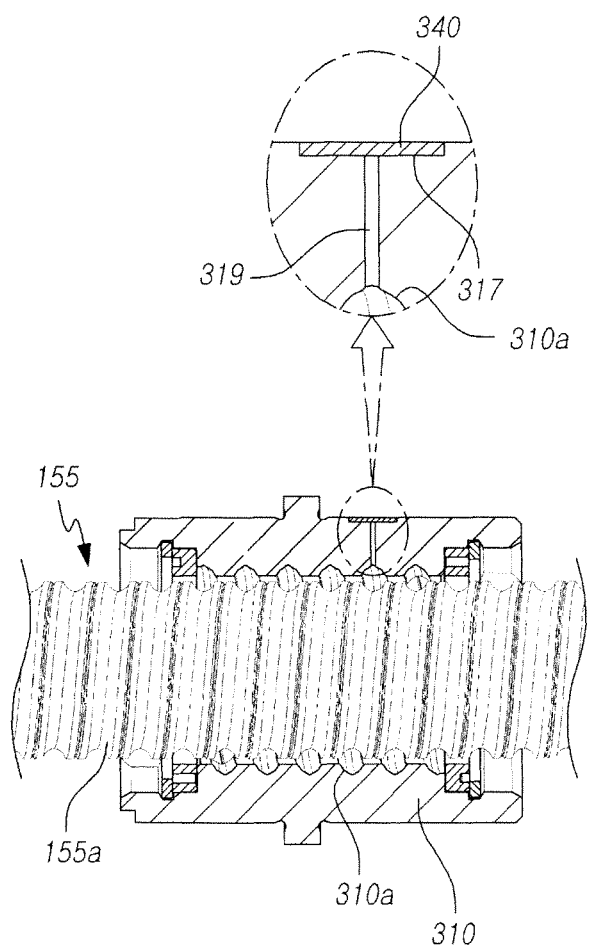

FIG. 3 is an exploded perspective view illustrating a portion of a rack-driven power steering apparatus according to the present invention. FIG. 4 is a perspective view illustrating a portion of the rack-driven power steering apparatus according to the present invention. FIG. 5 is a view illustrating a magnetic ball of the rack-driven power steering apparatus according to the present invention. FIGS. 6 and 7 are sectional views illustrating a portion of the rack-driven power steering apparatus according to the present invention.

As illustrated in the drawings, the rack-driven power steering apparatus according to the present invention includes a rack bar 155 having an outer peripheral screw groove 155a spirally formed on an outer peripheral surface thereof, a ball nut 310 having an inner peripheral screw groove 310a corresponding to the outer peripheral screw groove 155a on an inner peripheral surface thereof and having a ball circulation passage 315 axially extending between the inner peripheral surface and an outer peripheral surface thereof, a plurality of balls 320 inserted into the outer peripheral screw groove 155a, and the inner peripheral screw groove 310a to slide the rack bar 155 while rolling. At least one magnetic ball 330 having a magnetic force is disposed between the balls 320.

Figure 2:
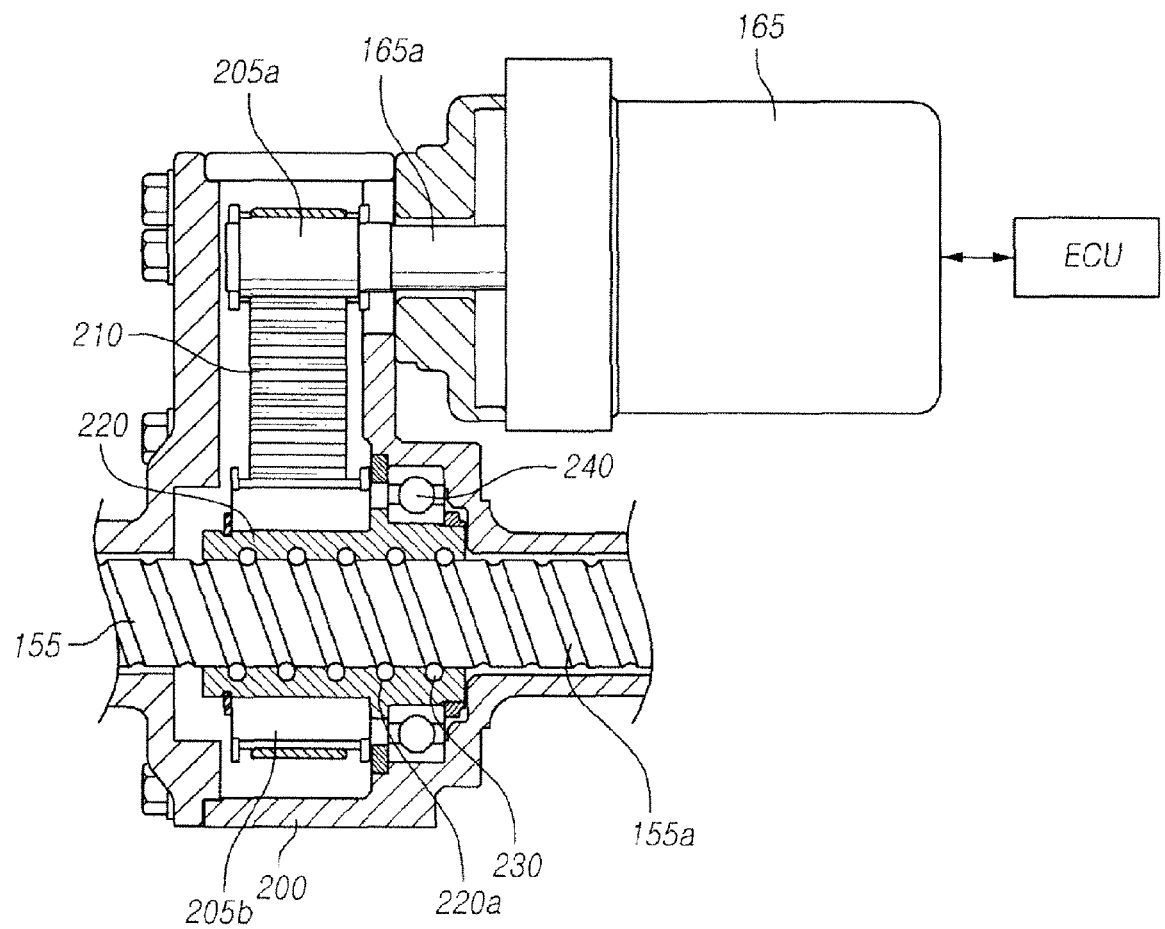
FIG. 2 is a sectional view schematically illustrating a belt type transmission unit of the general rack-driven power steering apparatus.

Referring to FIGS. 1 and 2, the belt type transmission unit of the rack-driven power steering apparatus includes a driving unit and a driven unit. The driving unit includes a motor 165 controlled by the electronic control unit (ECU), a motor pulley 205a coupled to a shaft 165a of the motor 165, and a belt 210.

The driven unit includes a ball nut 310 for supporting the rack bar 155 within the rack housing 200 surrounding the rack bar 155, and a nut pulley 205b on an outer peripheral surface of the ball nut 310.

The motor pulley 205a connected to the motor 165 and the nut pulley 205b connected to the rack bar 155 are disposed parallel to each other. The belt 210 is mounted on the motor pulley 205a and the nut pulley 205b to transfer a rotation power of the motor 165 to the rack bar 155 through the ball nut 310 and moves the rack bar 155 leftward and rightward through an operation of the ball nut 310 to generate an auxiliary steering power.

The ball nut 310 is coupled to the rack bar 155 via the balls 320 and slides the rack bar 155 within the rack housing 200 and the gear housing (not illustrated) while being rotated, and a nut pulley 205b for rotating the ball nut 310 and a bearing 240 for supporting rotation of the ball nut 310 are mounted to an outer peripheral surface of the ball nut 310.

A power transmission structure for axially sliding the rack bar 155 and generating an auxiliary steering power is provided on an inner peripheral surface of the ball nut 310 and an outer peripheral surface of the rack bar 155. The power transmission structure includes a spirally formed outer peripheral screw groove 155a having a semispherical or arc-shaped cross-section on an outer peripheral surface of the rack bar 155, balls 320 inserted thereinto, and a spirally formed inner peripheral screw groove 310a having a semispherical or arc-shaped cross-section on an inner peripheral surface of the ball nut 310 to correspond to the outer peripheral screw groove 155a.

The ball nut 310 is a hollow tube having the inner peripheral screw groove 310a on an inner peripheral surface thereof. The nut pulley 205b is attached to one side of an outer peripheral surface of the ball nut 310, the bearing 240 is installed at an opposite end of the outer peripheral surface of the ball nut 310, and lock screws are screw-coupled to an inner peripheral surface of the rack housing 200 at an end of an outer race and an end of an outer peripheral surface of the bearing to be fixed to the bearing 240 while supporting the bearing 240.

There is a ball circulation passage 315 axially formed between an inner peripheral surface and an outer peripheral surface of the ball nut 310 at one side of the ball nut 310, so, after moving along the inner peripheral screw groove 310a and the outer peripheral screw groove 155a and rolling from one side to the opposite side, the balls circulate through the ball circulation passage 315 again.

If the balls circulate the inner peripheral screw groove 310a and the outer peripheral screw groove 155a formed by the rack 155 and the ball nut 310, iron powder is generated by continuous frictions, disturbing movement of the balls 320 and generating noise.

Thus, at least one magnetic ball 330 is disposed between the balls 320 to retrieve the generated iron powder with a magnetic force.

That is, the iron powder dispersed here and there is stuck to a surface of the magnetic ball 330 and is collected while the magnetic ball 330 together with the other balls 320 circulates in the inner peripheral screw groove 310a and the outer peripheral screw groove 155a.

A diameter of the magnetic ball 330 is formed to be smaller than that of the balls 320 so as not to interfere with the inner peripheral screw groove 310a, the outer peripheral screw groove 155a, nor the other balls while circulating with the iron powder being stuck to its surface. A plurality of recesses 330a recessed concavely are formed on an outer peripheral surface of the magnetic ball 330 so that the iron powder can be collected in the recesses 330a on the surface of the magnetic ball 330 to be eliminated later.

Further, a resilient portion 330b of a resilient material is formed on an outer peripheral surface of the magnetic ball 330 and a plurality of radially formed holes 330c are provided in the resilient portion 330b, so that the iron powder can gather on the inner side of the holes 330c.

The ball 320a directly adjacent to the magnetic ball 330 may be formed of a resilient material, and as the adjacent ball 320a is formed of a resilient material, scratches due to contact with the adjacent magnetic ball 330 and noise is prevented as the magnetic ball 300 and the ball 320a roll along adjacent to each other.

Meanwhile, the iron powder collected by the magnetic ball 330 may be eliminated through disassembling and assembling of the rack bar 155 and the ball nut 310, but includes a separate iron powder eliminating structure for facilitating the elimination.

That is, as illustrated in FIG. 6, a mounting groove 317 to which the magnet 340 is mounted is formed at one side of an outer peripheral surface of the ball nut 310 and a communication hole 319 communicated with the ball circulation passage 315 is formed on the bottom surface of the mounting groove 317, in which case a magnetic force of the magnet 340 is stronger than that of the magnetic ball 330.

Thus, when the magnetic ball 330 to which the iron powder is attached passes through the ball circulation passage 315, the magnetic ball 330 is moved from the vicinity of the communication hole 319 through the communication hole 319 by vibrations or a stronger magnetic force of the magnet, so that the iron powder can be eliminated by removing the magnet 340 from the outside of the ball nut 310 without the operator having to disassemble the ball nut 310 and the rack bar 155.

As illustrated in FIG. 7, a mounting groove 317 to which the magnet 340 is mounted may be formed at an opposite side of an outer peripheral surface of the ball nut 310 and a communication hole 319 communicated with the inner peripheral screw groove 310a may be formed on the bottom surface of the mounting groove 317, in which case when the magnetic ball 330 to which the iron powder is attached passes through the inner peripheral screw groove 310a, the magnetic ball 330 is moved through the communication hole 319 by vibrations or a stronger magnetic force of the magnet 340 in the vicinity of the communication hole 319 to be attached to the magnet 340 so that the iron powder can be eliminated by separating the magnet 340 from the outside of the ball nut 310 without the operator having to disassemble the ball nut 310 and the rack bar 155.

The iron powder eliminating structure may be formed in either the ball circulation passage 315 or the inner peripheral screw groove 310a or in both.

The present invention can mitigate frictional force and noise produced due to iron powder generated by continuous friction while balls are circulating in inner peripheral screw grooves and outer peripheral screw groove defined by a rack bar and a ball nut The present invention also can collect iron powder scattered between the rack bar and the ball nut in one place so that the iron powder can be easily removed, protect components, increase durability, and improve maintenance efficiency.

Even if it was described above that all of the components of an embodiment of the present invention are coupled as a single unit or coupled to be operated as a single unit, the present invention is not necessarily limited to such an embodiment. That is, among the components, one or more components may be selectively coupled to be operated as one or more units.

In addition, since terms, such as "including," "comprising," and "having" mean that one or more corresponding components may exist unless they are specifically described to the contrary, it shall be construed that one or more other components can be included. All of the terminologies containing one or more technical or scientific terminologies have the same meanings that persons skilled in the art understand ordinarily unless they are not defined otherwise. A term ordinarily used like that defined by a dictionary shall be construed that it has a meaning equal to that in the context of a related description, and shall not be construed in an ideal or excessively formal meaning unless it is clearly defined in the present specification.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A rack-driven power steering apparatus comprising:
   a rack bar having an outer peripheral screw groove spirally formed on an outer peripheral surface thereof;
   a ball nut having an inner peripheral screw groove corresponding to the outer peripheral screw groove on an inner peripheral surface thereof and having a ball circulation passage axially extending between the inner peripheral surface and an outer peripheral surface thereof; and
   a plurality of balls inserted into the outer peripheral screw groove and the inner peripheral screw groove to slide the rack bar while rolling,
   wherein at least one magnetic ball having a magnetic force is disposed between the balls.

2. The rack-driven power steering apparatus of claim 1, wherein a diameter of the magnetic ball is smaller than a diameter of the other balls.

3. The rack-driven power steering apparatus of claim 2, wherein a plurality of recesses recessed concavely is formed on an outer peripheral surface of the magnetic ball.

4. The rack-driven power steering apparatus of claim 2, wherein the magnetic ball has a resilient portion formed of a resilient material on an outer peripheral surface thereof.

5. The rack-driven power steering apparatus of claim 4, wherein a plurality of radially formed holes are provided in the resilient portion.

6. The rack-driven power steering apparatus of claim 2, wherein one of the plurality of balls directly adjacent to the magnetic ball is formed of a resilient material.

7. The rack-driven power steering apparatus of claim 1, wherein a mounting groove to which a magnet is mounted is formed at one side of the outer peripheral surface of the ball nut, and a communication hole communicated with the ball circulation passage is formed on a bottom surface of the mounting groove.

8. The rack-driven power steering apparatus of claim 7, wherein a mounting groove to which the magnet is mounted is formed at an opposite side of an outer peripheral surface of the ball nut, and a communication hole communicated with the inner peripheral screw groove is formed on a bottom surface of the mounting groove.

9. The rack-driven power steering apparatus of claim 8, wherein a magnetic force of the magnet is stronger than a magnetic force of the magnetic ball.

10. The rack-driven power steering apparatus of claim 1, wherein a mounting groove to which a magnet is mounted is formed at one side of the outer peripheral surface of the ball nut and a communication hole communicated with the inner peripheral screw groove is formed on a bottom surface of the mounting groove.

* * * * *